United States Patent [19]
Jackson et al.

[11] Patent Number: 5,954,917
[45] Date of Patent: Sep. 21, 1999

[54] AUTOMATED MATERIAL DELIVERY SYSTEM

[75] Inventors: Dana B. Jackson, Broken Arrow; Ronald G. Halcomb, Tulsa; Don L. Asher, Broken Arrow; John E. Vogt, Tulsa, all of Okla.

[73] Assignee: Boeing North American, Inc., Seal Beach, Calif.

[21] Appl. No.: 08/867,596

[22] Filed: Jun. 2, 1997

[51] Int. Cl.$^6$ .................................................. B32B 31/00
[52] U.S. Cl. .......................... 156/433; 156/441; 156/523; 156/573
[58] Field of Search .................................. 156/171, 169, 156/433, 441, 573, 523, 286, 425; 264/285

[56] References Cited

U.S. PATENT DOCUMENTS

| | | | |
|---|---|---|---|
| 3,041,230 | 6/1962 | Diehl | 156/177 |
| 4,259,144 | 3/1981 | Ballentine | 156/523 |
| 4,475,976 | 10/1984 | Mittlelstadt et al. | 156/286 |
| 4,726,924 | 2/1988 | Mittelstadt | 156/180 X |
| 4,867,834 | 9/1989 | Alenskis et al. | 156/433 |

FOREIGN PATENT DOCUMENTS

| | | |
|---|---|---|
| 2579130 | 9/1986 | France . |
| 2423914 | 12/1975 | Germany . |

OTHER PUBLICATIONS

Sales Brochure From Cincinnati Milacron Entitled "Into the Future . . . With Better Ways to Automate the Manufacture of Composite Parts," 1988, pp. 1–22.

*Primary Examiner*—Jeff H. Afterfgut
*Attorney, Agent, or Firm*—Terrell P. Lewis; Alston & Bird LLP

[57] ABSTRACT

The invention is a process and apparatus for forming structural members from layers of uncured composite material. The apparatus comprises a first station having at least one tape dispensing module, a second station where tape layers that have been deposited on a tool are vacuum treated in order to remove air entrapped between layers of the tape, and a track system which enables movement of the tool between the first and second stations as well as a tool storage station. The process of building the structural members comprises dispensing tape from each of the modules at the first station onto a tool, then removing entrapped air from between layers of deposited tape, then dispensing further layers of tape, then removing entrapped air, etc., until the desired tape configuration has been achieved. Until such built-up structural member is cured, it is stored in racks in the tool storage station. A unique "partial ply" module is disclosed for applying tape segments to the side forming surfaces of the tool.

12 Claims, 11 Drawing Sheets

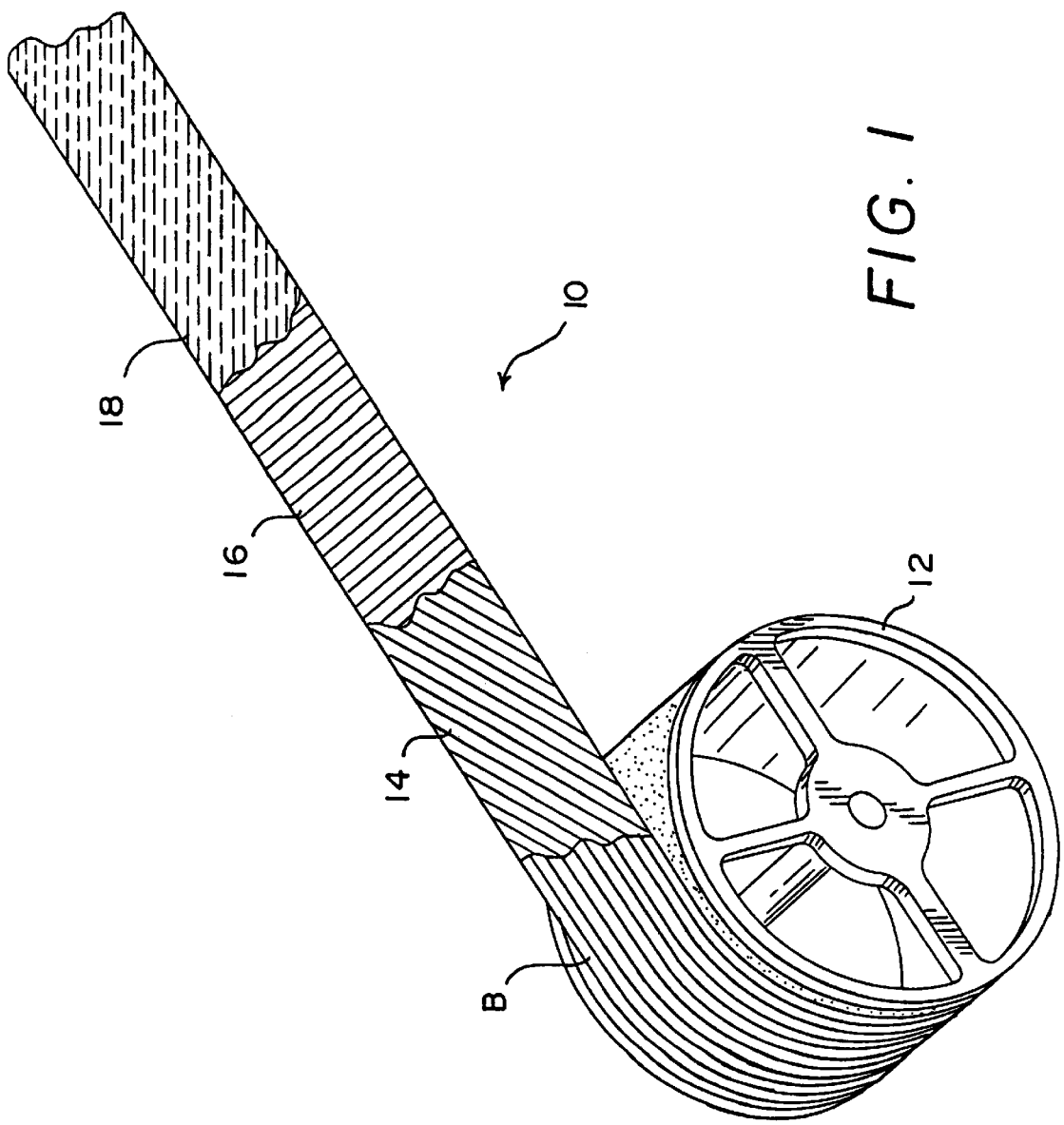

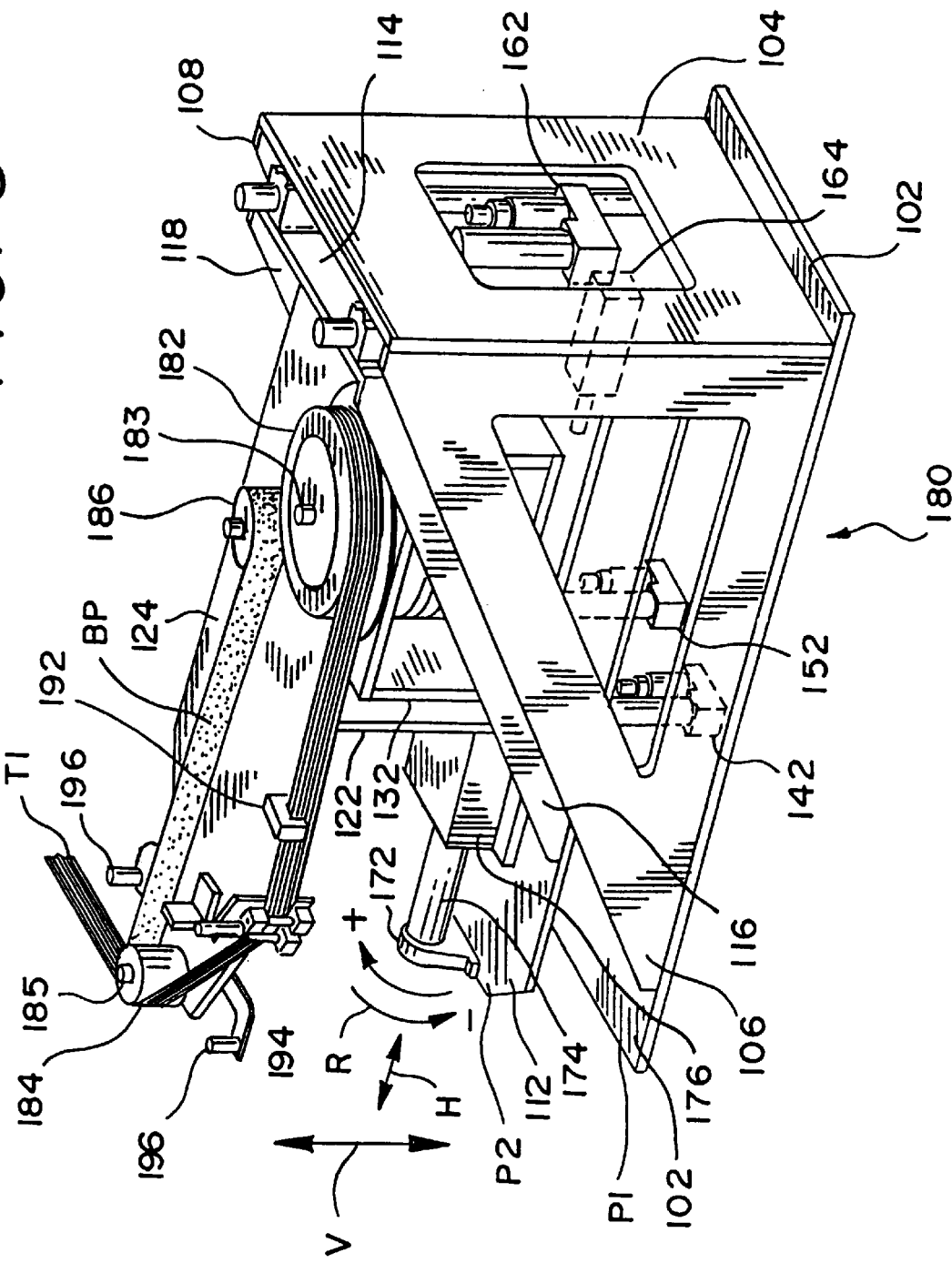

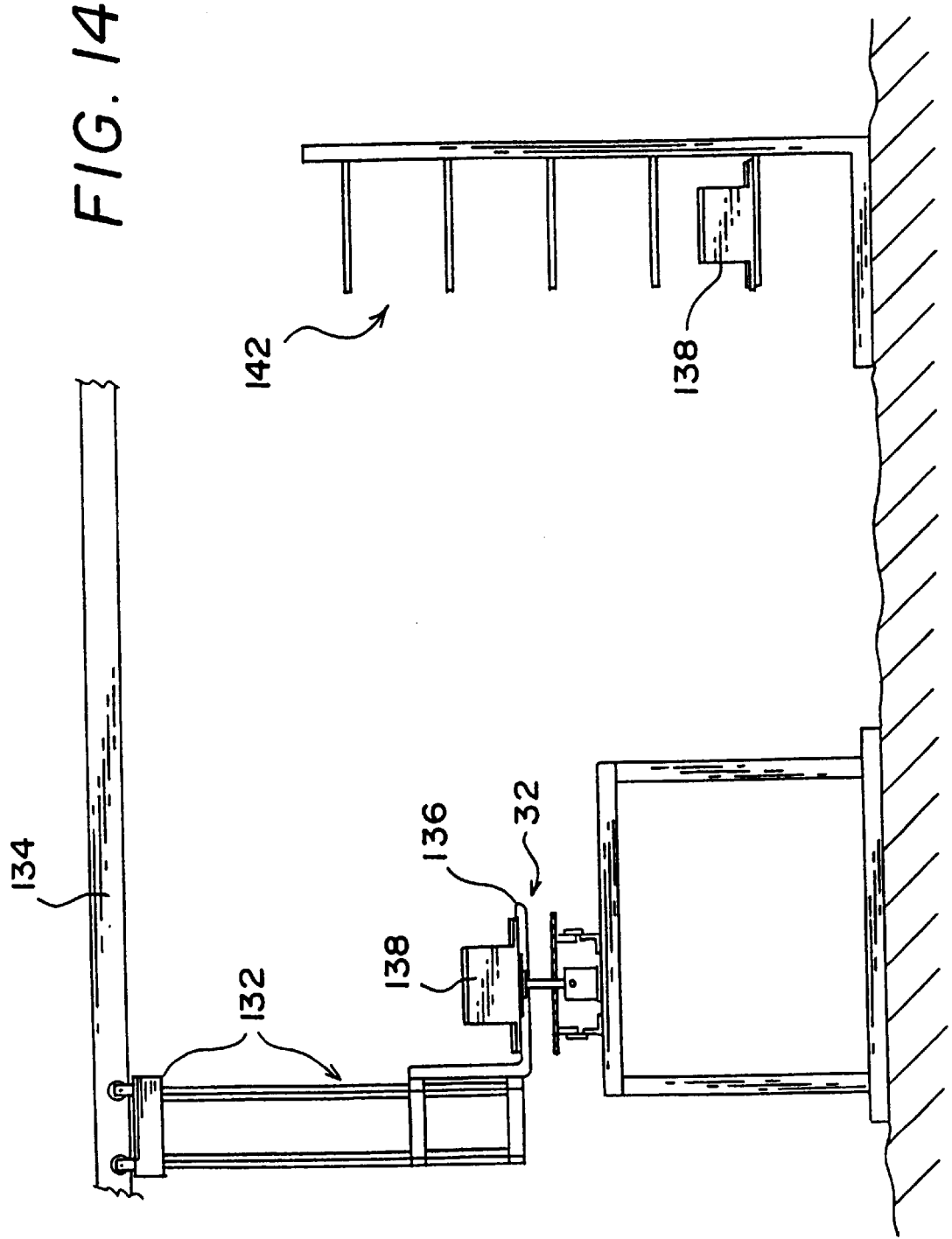

AUTOMATED MATERIAL DELIVERY SYSTEM

BACKGROUND OF THE INVENTION

1. Field of the Invention

The present invention relates to a method and apparatus for automatically dispensing segments of a web of one or more layers of fiber-reinforced composite material from spools, as well as the placement and shaping of the web segments to contoured surfaces of a tool, prior to curing of the web segments on the tool in an autoclave or other curing apparatus.

2. Description of the Related Art

Apparatus for the manufacture of structural members from layers of composite materials, fiber-reinforced or otherwise, is well-known. Such apparatus, however, has a variety of drawbacks.

Automated tape layer (ATL) apparatus places single layers of uncured composite pre-impregnated unidirectional tape on a flat or near-flat contoured surface. Compaction pressure, and if necessary, heat is applied to cause the layers of the material to be consolidated prior to curing.

However, ATL apparatus has proven to be unsatisfactory; the tape webs exhibit non-elastic behavior, the web path lengths change due to tool contours, the ATL apparatus is only capable of single layer placement and there is no final forming to shape.

Automated fiber placement (AFP) apparatus is also known in which single layers of uncured composite pre-impregnated unidirectional tape can be placed on severely contoured surfaces. Numerous individual yarns of uncured pre-impregnated structural fiber can be applied to the contoured surfaces. Each yarn is controlled to feed at such a rate that the dispensed yarn length matches the web path length due to the tool contour changes.

Compaction of the material is also performed at the head, thus causing consolidation of the material during lay-up. However, AFP apparatus is also undesirable; many types of composite pre-impregnated materials are not available in yarn form, the apparatus is able to place only a single layer at a time, and there is no final forming to shape.

Still another known apparatus performs automated filament winding. This machinery provides the placement of single yarns of uncured composite pre-impregnated unidirectional material on contoured surfaces of a tool that rotates about its central axis as a yarn or filament is dispensed from a dispensing head. Compaction is accomplished with a compaction head and heat if needed. This apparatus has the same drawbacks as the AFP apparatus, and in addition requires the tool configuration to be mounted on a rotating mechanism.

Against this background of known prior art, applicants have developed a new, more efficient, speedier, and cost-effective process for building fiber-reinforced structural members from multiple layers of composite material.

OBJECTS AND SUMMARY OF THE INVENTION

It is therefore an object of the present invention to provide a novel system for automatically dispensing segments of uncured composite material layers from spools to form structural members directly on tool surfaces, while overcoming drawbacks and disadvantages of similar systems known in the prior art.

Another object of the present invention is to provide a novel system for dispensing multiple layers of segments of composite material onto highly contoured tool surfaces from spools to form structural members.

Still another object of the invention is to provide a novel method and apparatus for arranging successive layers of reinforce matrix material, one atop the next, so as to create structural members.

These and other objects are attained through the present invention which includes a tape dispensing station comprising at least one tape dispensing module arranged adjacent to a tool loading station where tape dispensed from a module is applied to the surface of a tool that has been positioned at the module, and apparatus for moving the tool between the location where a tool treatment takes place to the tool loading station where layers of composite material tape segments are deposited on the tool.

One or more tape dispensing modules are located at the tape dispensing station. For each tape segment having an array of layers exhibiting a unique reinforcing fiber orientation, a separate tape dispensing module will be used.

The apparatus for moving the tool between stations comprises a system of track elements, a skate having wheels or other track engaging devices that enable movement of the skate along the assembled track elements, and a motor apparatus for imparting motion to the skate.

The tape segments may have a variety of configurations and combinations of layers of unidirectional composite material. Each layer can have fiber-reinforcement oriented at specific angles to adjacent layers, with the angles being determined in correspondence with the desired final properties of the final cured structural laminate.

The process and apparatus of the present invention embraces loading multi-layered composite material webs onto web-dispensing modules, where each web has specified layers and fiber orientations. A lay-up tool is positioned before each module, in a specified manner, and a selected number of layers is deposited on its forming surface before it is moved to the next module where a similar "lay-up" process is performed.

By using the inherent tackiness of the uncured resin matrix within the composite material, individual layers of material from each module can be applied first to the lay-up tool surface, and thereafter to each previously applied layer. Using the skate and track system, the lay-up tool can then be transported to a drape forming apparatus where the most recently applied web segment can be pressed against the tool and into the predetermined configuration of the structural member to be formed.

BRIEF DESCRIPTION OF THE DRAWINGS

FIG. 1 shows a composite material cross-ply tape of a type contemplated for use by the present invention;

FIG. 8 shows a partial ply tape dispensing module;

FIG. 14 is an end view of a tool storage and transport system used in the present invention.

DETAILED DESCRIPTION OF THE INVENTION

Figure 2B:
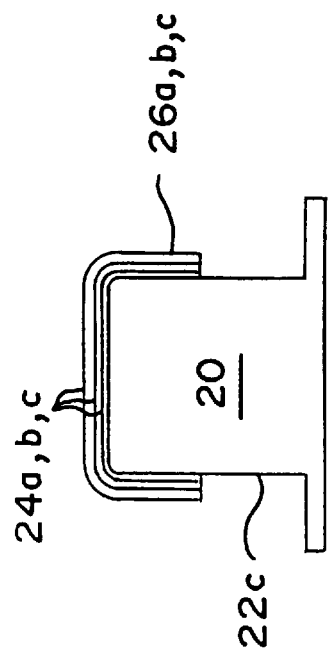
FIG. 2B is a cross section of the tool and tape shown in FIG. 2A illustrating one configuration which could be used to form a U-section structural member.

The following detailed description is of the best currently contemplated modes of carrying out the invention. The description is not to be taken in a limiting sense, but rather is made merely for the purpose of illustrating the general principles of the invention, since the actual scope of the invention can be best determined by the appended claims.

Throughout this detailed description, similar elements or parts in the various views of the drawings are designated by the same or similar reference characters.

As used in this description, a "ply" is one layer of material, and the term "cross-ply book" denotes a plurality of layers of material which are superimposed on each other. The term "cross-ply" more specifically refers to layers of material having axes of adjacent layers rotated relative to one another at angles of other than 180° and 360°, principally for enhancing the structural and behavioral characteristics of the resulting structural member once it is cured.

Since all cross-ply books are continuous, dispensed from spools, and have a finite width, the term "web" is also used to denote either a single ply or a plurality of layers of uncured fiber-reinforced composite materials.

Referring now to FIG. 1, there is shown an exemplary web 10 of uncured, composite material which has been wound on a spool 12. The web 10 may comprise one or more layers of uncured composite material on a backing paper or film. Preferably, the web will include a mat of reinforcing material having unidirectional or woven reinforcing fibers of metallic or inorganic material disposed in a matrix.

Within a cross-ply book or a web successive layers will be arranged at angular orientations to one another, typically at angles of +45°, 90°, and −45° (as shown in FIG. 1 at 14, 16, and 18), on an underlying base or carrier layer B of a backing paper or film, or unidirectional matrix material on a backing paper or film, to effect desired behavioral and physical characteristics of the resulting structural member, as described above.

The so-formed webs of the composite material are wound and stored, after being formed, on a spool 12 such as is shown in FIG. 1. Where the web 10 includes the base or carrier layer B, the web is preferably wound on the spool 12 so that the base or carrier layer B is disposed on the side of the tape closest to the spool center.

Figure 2A:
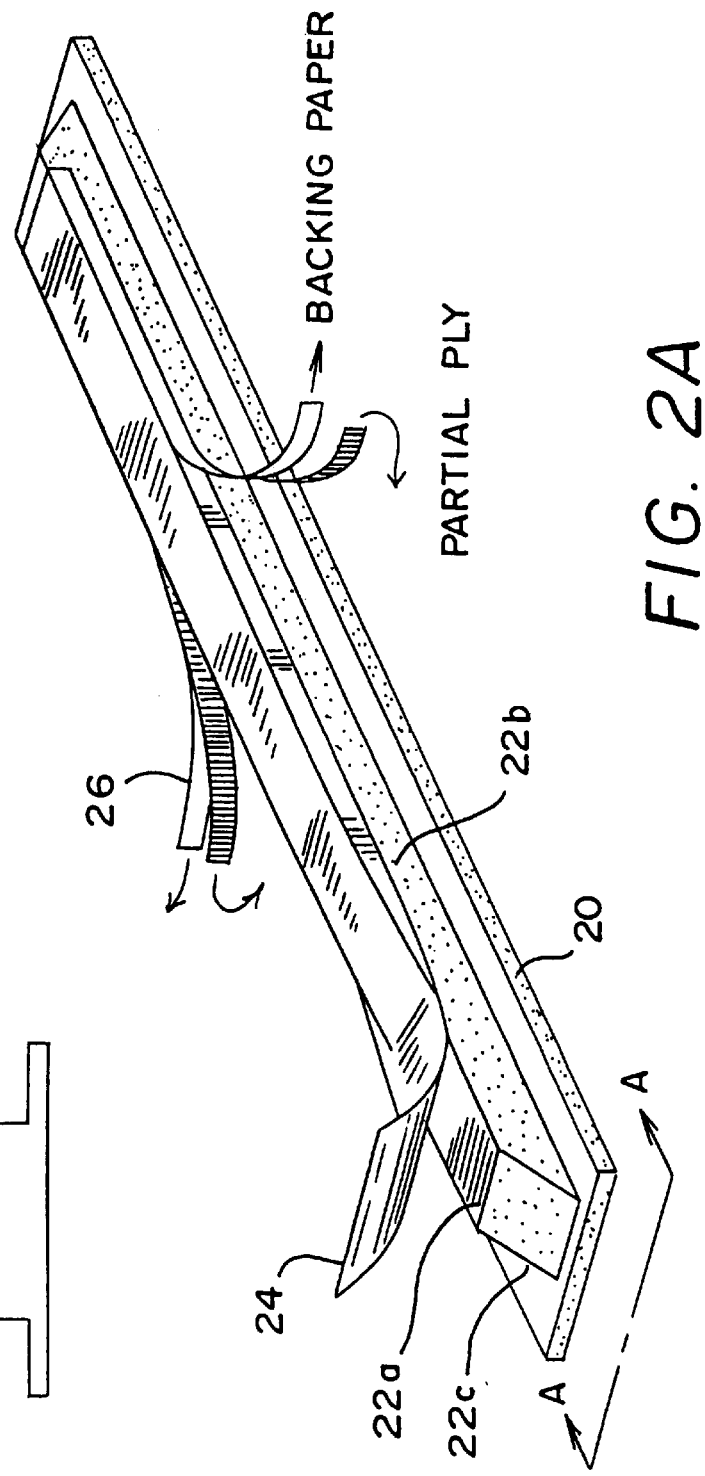
FIG. 2A shows a tool with tape deposited thereon.

FIGS. 2A and 2B show one embodiment of a tool and a tape lay-up configuration which might be used to form a U-section structural member. Reference to such structural member and the tool will be made hereinafter in order to facilitate this description of the present invention.

When reading the following description, it is to be understood that tools used in the formation of structural members can have many different cross-sectional shapes or configurations, and that the tool shown in FIGS. 2A and 2B is only exemplary.

Referring now to FIGS. 2A and 2B, the tool 20 is seen to include a body having an upper surface 22a and vertical surfaces 22b, 22c on opposite sides of the surface 22a. Tape segments 24a, 24b, 24c . . . are applied to the upper surface 22a of the tool 20 in the manner shown, while tape segments 26a, 26b, 26c, . . . are applied to the vertical surfaces 22b, 22c of the tool. Segments 24a, 24b, 24c, . . . , known as "full plies", are of full width and cover the top surface of the tool as well as the side surfaces. Segments 26a, 26b, 26c . . . are "partial plies" having reduced width, and serve (in the structural member shown here) essentially to provide structural strengthening at the side flanges and corners of the structural beam member to be formed.

Typically, the partial plies will be applied to the structural member being built up in alternating sequence with the full plies being applied first. The partial plies may be applied over the next preceding full ply such that the innermost partial ply covers the greatest area of the innermost full ply, the next outer partial ply covers slightly less area of the next outer full ply, and so on, so that a feathering effect is achieved.

Figure 3A:
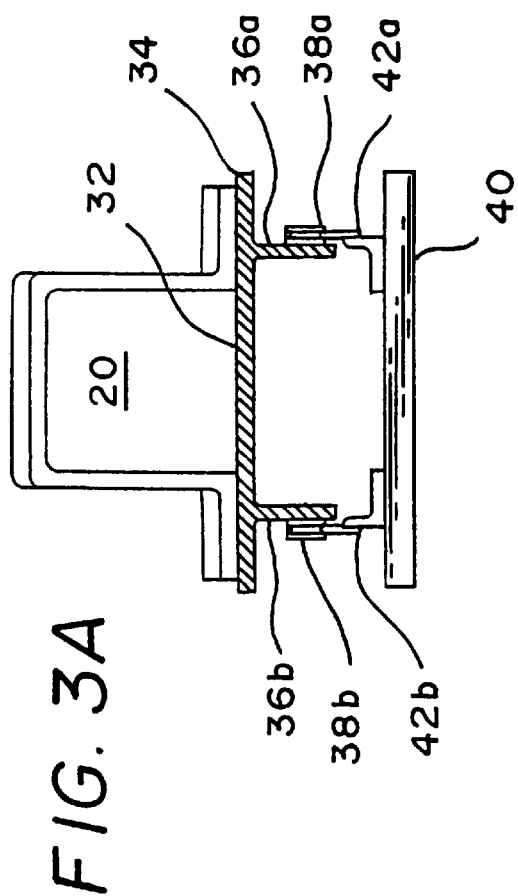
FIG. 3A is an end view of the tool shown in FIGS. 2A and 2B, and a skate supported on a track system located between various stations of the system.
Figure 3B:
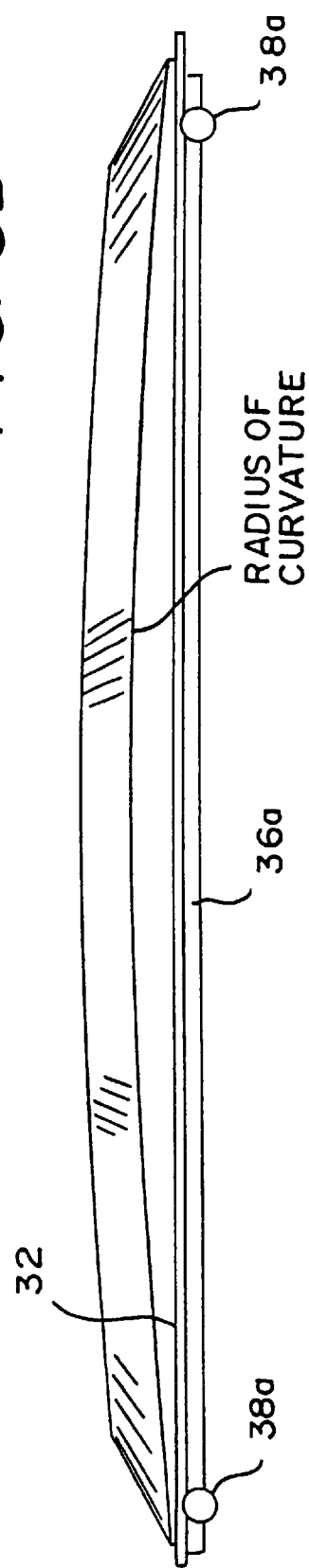
FIG. 3B is a side view of the tool and skate shown in FIG. 3A.

FIGS. 3A and 3B depict the tool of FIG. 2 supported on a skate 32 which travels along a track system 40 located beneath or beside the various stations of which the present invention is comprised (to be described below). The skate comprises a flat plate 34 having a substantially horizontal surface or bed 32 on which the tool is placed and opposing, parallel side walls 36a, 36b. Each of the side walls supports a plurality of wheels or rollers 38a, 38b which are spaced apart a distance corresponding to the distance between the parallel track rails 42a, 42b of the track system 40.

The length and width of the flat skate bed is able to support any of the tools used by this invention to form structural members.

Track system 40 (see FIG. 15) extends between a "tool storage" station (not shown), a bank of material delivery modules 400, 500 where composite tape segments are applied to the tool, a "tool loading" station where tool preparation and laminate removal are performed, and a "debulking" station 300 where the layers of composite tape segments deposited on the tool are pressed against the tool to eliminate air entrapment and separations.

The invention contemplates a machine operator overseeing operation of the control system via a control panel. All programs to manufacture parts will be stored in a central memory bank.

FIGS. 4–7 illustrate four embodiments of tape dispensing modules which are contemplated for transferring tape from various ones of the spools on which the tape is stored to the forming surface of a tool, such as the tool shown in FIG. 3.

Preferably, each of the modules includes an upper portion "UP" on which the tape dispensing components are supported and a lower portion "LP" for positioning and securing the respective module in a desired position along the track 40.

The height of the lower portion "LP" of each of the modules (above the floor of the facility where the modules will be located) is chosen so that the tape carried on each of the modules is dispensed substantially at the height (above the same floor) of the forming surface of the tool.

Generally, the function of each of the four modules next described below is to dispense uncured plies of layers of composite tape of varying widths and ply orientations onto the top "forming" surface of a tool, and then using a nip roller, press the last laid layer against the underlying substrate (either the tool itself or a previously-laid layer), and then cut the layer to an exact predetermined length.

Figure 4:
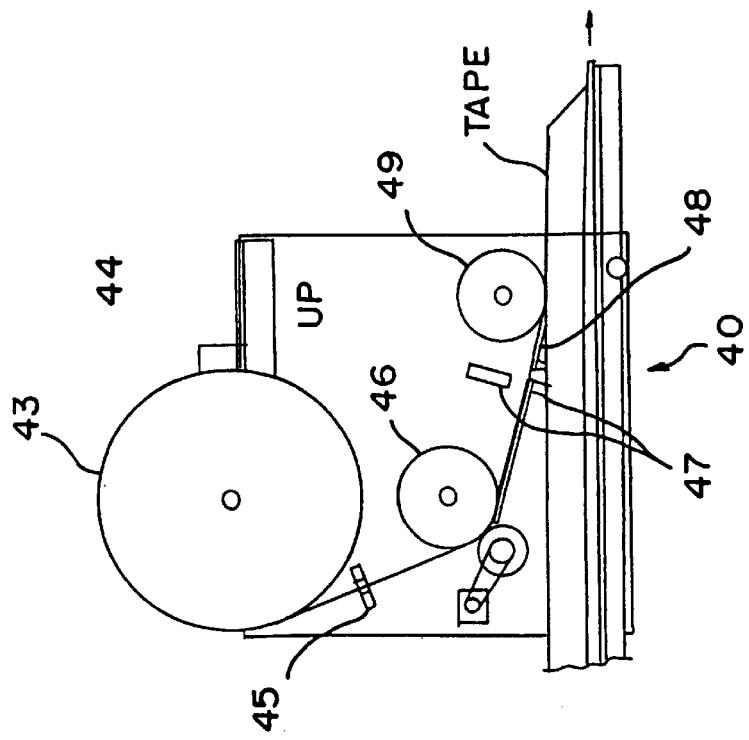
FIG. 4 shows a first tape dispensing module.

In the module shown in FIG. 4, the upper portion of the module 40 includes a spool 43, a carriage 44, an edge guide 45, an idler roll 46, a shear 47, a guide plate 48, and a nip roll 49. A multi-layered web T is stored on the spool 43 for dispensing onto the forming surface of the tool. The carriage 44 supports the spool 43. The edge guide 45 maintains alignment of the web T coming off the spool 43 with the idler roll 46. The carriage 44 also provides lateral movement for the spool 43 in response to feedback from the edge guide 45, and therefore guides the web T during the process of unwinding the spool 43 to make sure the web is held in one location laterally of the centerline of the lay-up tool. The shear 47 is provided for severing the web T after a predetermined length of the web has been deposited on the tool forming surface. The nip roll 49 applies pressure to the web T as it is deposited on the forming surface of the tool.

The web T, when dispensed by the module shown in FIG. 4, retains the backing paper or film. The web is deposited on the tool forming surface so that the layer of paper or film is located on the top side of the just deposited web layer. This is necessary because some backing papers or films are too delicate or weak to activate the free load indexing of the web T.

Figure 5:
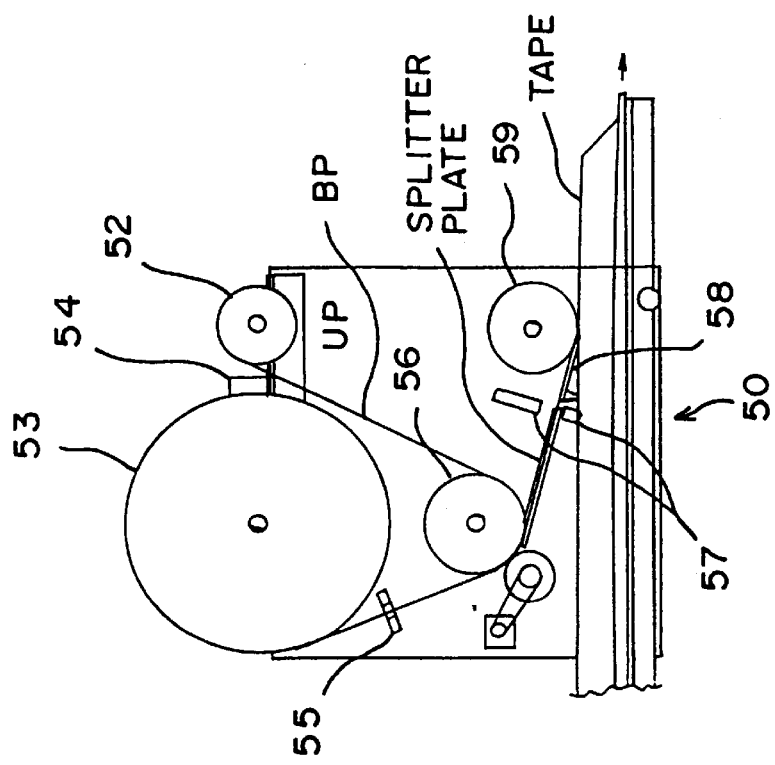
FIG. 5 shows a second tape dispensing module.

In the module shown in FIG. 5, the upper portion includes a spool 53 on which is stored a multi-layered web T to be dispensed onto the forming surface of a tool, a carriage 54 for supporting the spool 53, an idler roll 56, a shear 57 for cutting the tape T after a predetermined length of the tape has been laid on the tool forming surface, and a nip roll 59 to apply pressure to the web T as it is laid on the forming surface. A takeup spool 52 is supported on the carriage 54 for winding up the backing paper which is removed from the web T as it passes the idler roll 56. A splitter plate SP has one end positioned adjacent and substantially tangential with the idler roll 56, and the opposite end adjacent and substantially normal to the shear 57. The guide plate 58 and splitter plate SP support the web in its travel from the idler roll 56 to the nip roll 59 after the backing paper BP has been stripped off the web T at the roll 56.

Figure 6:
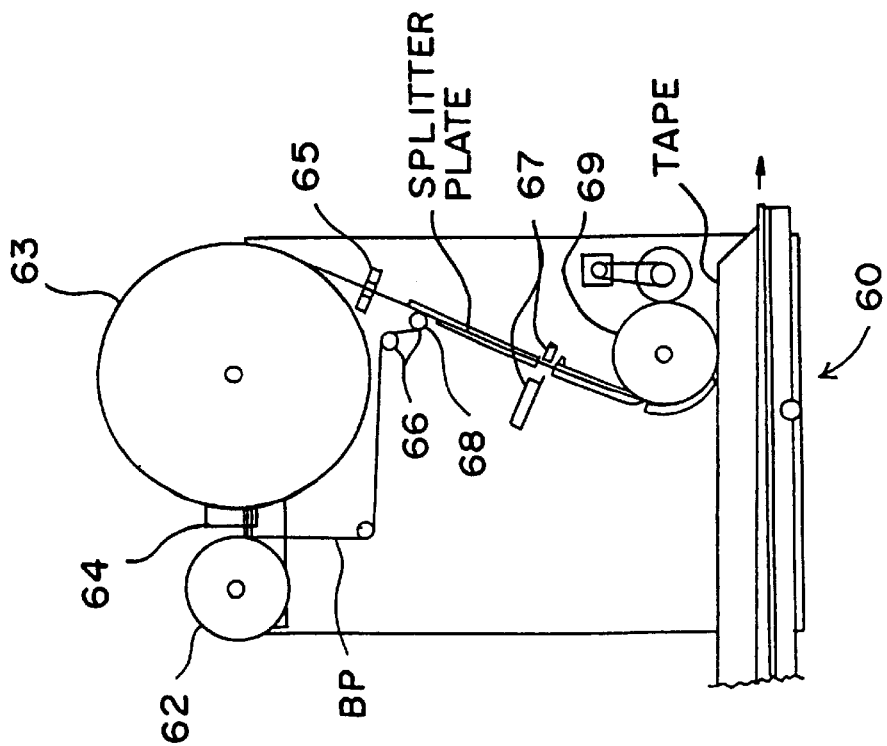
FIG. 6 shows a third tape dispensing module.

In the module shown in FIG. 6, the upper portion includes a spool 63 for storing a multi-layered web to be dispensed onto the forming surface of the tool, a carriage 64 for support of the spool 63, an edge guide 65 to keep the innermost edge of the web from coming off the spool spaced from the front plate of the module 60. Idler rolls 66 guide the backing paper BP to the roll 62. A shear 67 is supported downstream of the edge guide 65 for severing the web T after a predetermined length has been laid on the tool forming surface. Also included is an idler roll 68 and a nip roll 69. A paper takeup spool 62 is supported on the carriage 64 for winding up backing paper BP which has been removed from the web T as it passes idler roll 66.

The operation of the module 60 is similar to the operation of the module 50. However, in module 60, the backing paper is removed and then the web T is flipped over so that the off-axis fiber layers are reversed. Thus, fiber layers having a +45° orientation on the spool will have a −45° orientation on the tool.

Figure 7:
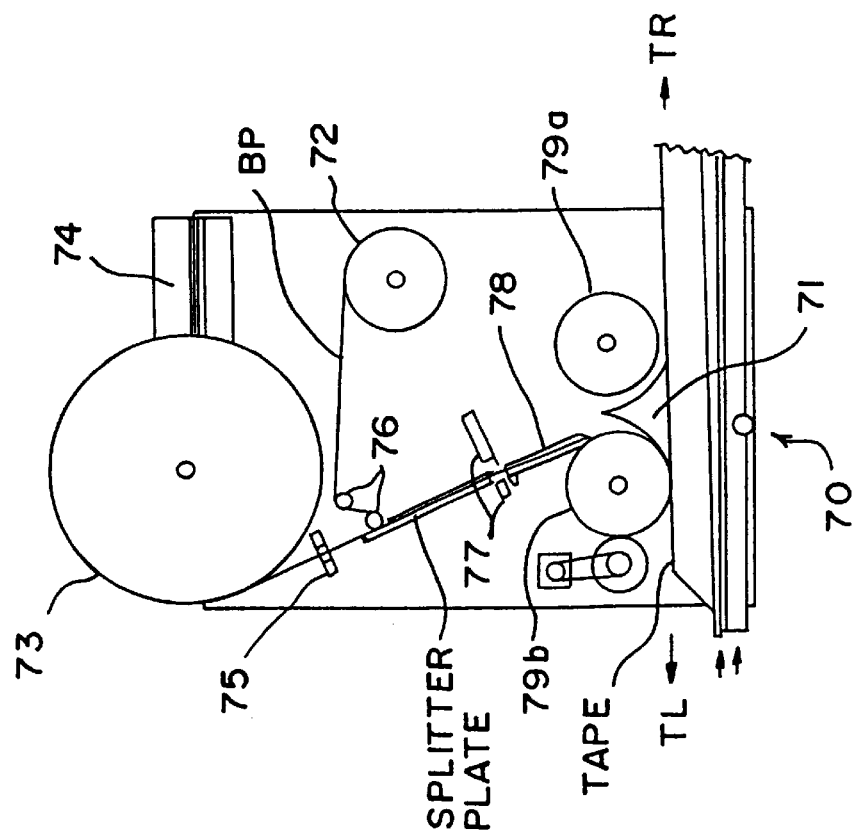
FIG. 7 shows a fourth tape dispensing module.

In the module 70 shown in FIG. 7, the upper portion includes a tape storage spool 73 on which is wound a multi-layered web which is to be laid onto the forming surface of a tool, a carriage 74 for support of the spool 73, a pair of idler rolls 76, an edge guide 75 for keeping the web coming off the spool aligned with the centerline of the of the lay-up tool, a shear 77 for cutting the web after a predetermined length has been laid on the tool forming surface, and two nip rolls 79a and 79b. The web is unwound from the spool 73, and at the idler rolls 76, the backing paper or film is separated from the web and wound around the takeup spool 72 mounted on the carriage 74.

Thereafter, the web (now without the backing paper) passes around either one of the nip rolls, depending on the direction of travel desired for the material of the tape (i.e., either in a right-hand direction (web $T_R$ in a left-hand direction (web $T_L$)). Module 70 also includes a web guide 71 and a guide plate 78. The web guide functions to guide the paper-backed web to either nip roll 79a or 79b, as required to achieve the desired reversal of fiber orientations.

FIG. 8 depicts a "partial ply" module 180 which facilitates the application of partial segments of a web to opposing sides of the lay-up tool. When used as part of the present invention, the partial ply module 180 is placed on both sides of the lay-up tool so that application of the segments to each side of the tool can be effected at the same time.

The partial ply module 180 in FIG. 8 includes an outer platform P1 and an inner platform P2 movable relative to the outer platform. The outer platform P1 includes a base 102, a back plate 104, and side reinforcing plates 106, 108 connecting the base with the back plate.

The lower platform P2 includes a base 112, a back plate 114, and side plates 116,118 securely connecting the base 112 with the back plate 114. The tape dispensing portion of the partial ply module is supported by a box mounted on the inner platform and includes an outer frame 122 and an inner frame 132.

A first vertically movable actuator 142 has a lower portion which is positioned on and secured to the outer platform P1, and an upper portion which is secured to the inner platform P2. Only one actuator 142 is required to effect a roll movement of the inner platform P2 about a horizontal axis. The actuator 142 is preferably electrically driven.

A second vertically movable actuator 152 has a lower portion which is positioned on and secured to the outer platform P1, and an upper portion which is secured to the floor of the outer frame 122 of the support box. Only one actuator 152 is needed to effect a vertical movement of the support box 132 relative to the inner platform.

The actuator 152 is preferably electrically driven, and effectively constitutes an unwind guidance mechanism that aligns the web with pinch roller 184 using input from the edge sensor 192.

A third vertically movable actuator 162 is secured between the back plate 114 of the inner platform P2 and the back plate 104 of the outer platform P1. The actuator 162 is used to effect vertical movement of the inner platform relative to the outer platform. Preferably, the actuator 162 is electrically driven. The actuator 162 establishes the height relation between the web T at the pinch roller 184 and the layup die position.

Also secured between the back plate 104 of the outer platform P1 and the back plate 114 of the inner platform P2 is a horizontally movable actuator 164 which is used to effect horizontal movements of the inner platform P2 relative to the outer platform P1. The actuator 164 is also preferably pneumatically driven so that the tack pressure on the web T at the pinch roller 104 is controllable against the lay-up die.

Positioned on the platform P2 is a support 172 secured about a spindle or shaft 174 which is mounted in a bearing housing 176 connected to the box outer frame 122. A second bearing is housed within the housing, but it is not shown.

The support box can be moved horizontally, vertically and with roll adjustments relative to the outer frame. The shaft 174 and bearings permit the support box to roll to one side or the other side (in the direction R as shown) about the longitudinal axis of the shaft. The actuator 162 enables movement of the support box along a vertical axis V. The actuator 164 enables movement of the support box along a horizontal axis H.

The outer frame of the support box includes a top plate 124 on which is carried a partial ply tape dispensing mechanism. The material dispensing spool 182 carries a supply of single-layer uncured composite tape. The spool is mounted on a shaft 183 supported by the support box. The web T is pulled off the spool 182 and along a path to a pinch roller 184 mounted on a shaft 185. The pinch roller is urged into contact with the side of the tool to which the partial ply layer of material is to be applied. The pinch roller enables removal of the backing paper BP from the web T, so that only the pure composition tape T1 is applied to the tool side surface.

A backing paper takeup spool 186 is positioned alongside the dispensing spool 182. Also disposed in the path of travel of the tape T are an edge sensor 192, a one sided shear 194 and roll sensors 196. The edge sensor 192 supplies signals to the support box causing the actuator 152 to move the box up and down during the unwind operation for web guidance. The shear is used after the lay-up tool has stopped a predetermined distance before the entire web T is applied to the tool sides. The tool then continues until the shear tape edge reaches the pinch roller 184. Then the support box is retracted to separate the pinch roller 184 from the tool, thus leaving the last applied web layer attached to one, the other, or both of the sides of the tool.

The roll sensors 196 cause movement of the actuator 142 to keep the support box 124 in a plane tangent to the tool's radius of curvature.

Figure 9:
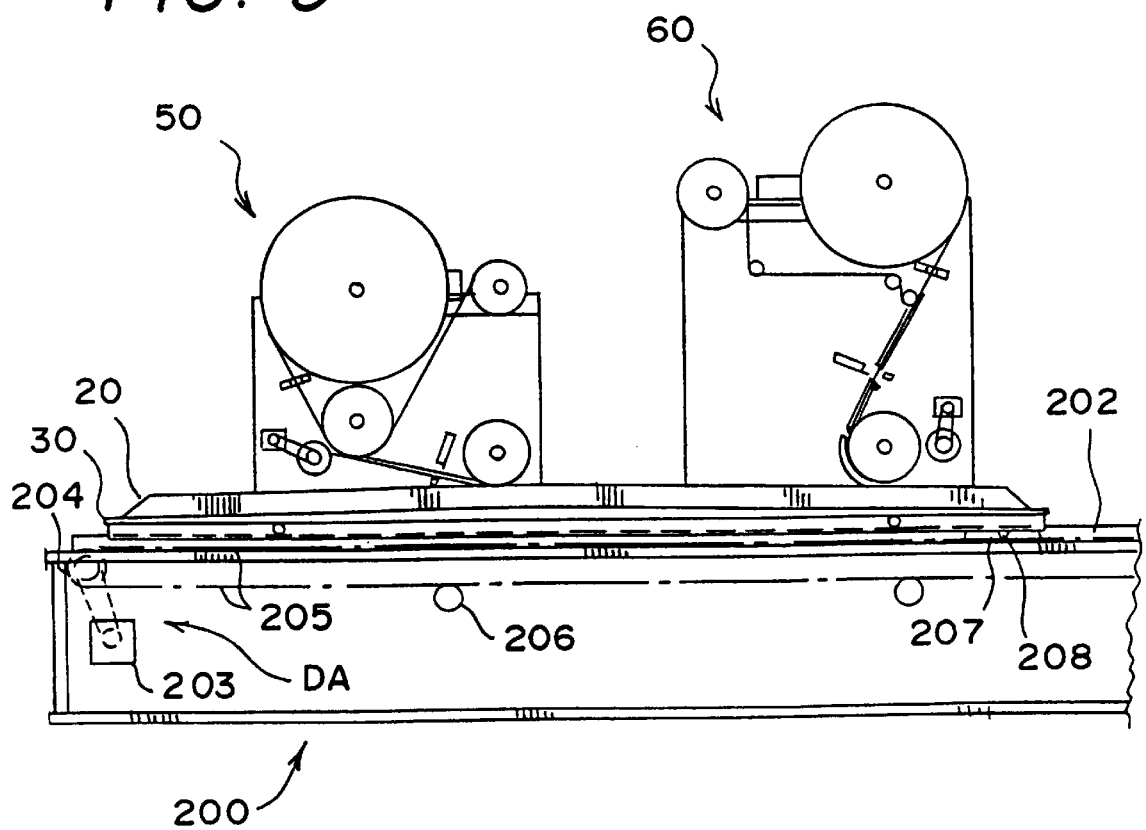
FIG. 9 shows the tape dispensing station with tapes being dispensed from two modules onto the tool forming surface.
Figure 10:
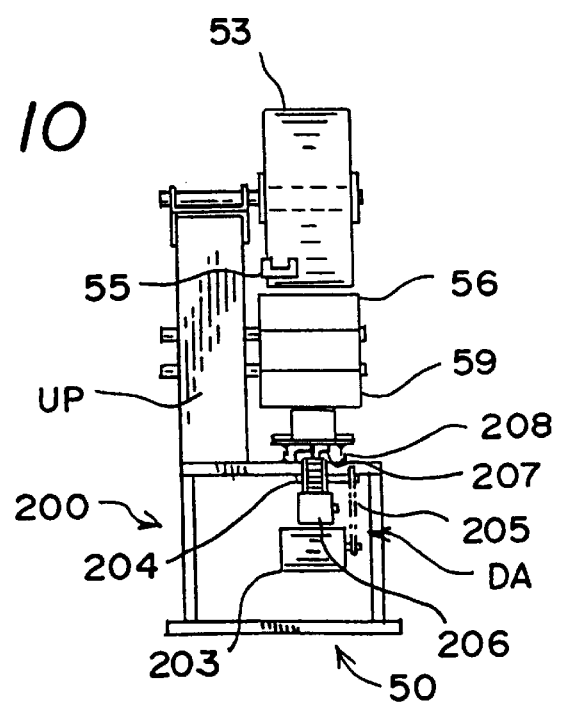
FIG. 10 is an end view of the apparatus seen in FIG. 9.

FIGS. 9 and 10 show two tape dispensing modules positioned adjacent a tool transport table 200.

In FIG. 9, a track 202 (analogous to the track elements shown in FIGS. 3A and 3B) is supported on the upper surface of the table 200. The skate 30 can roll along the track to various stations of the system. Two dispensing modules 50 and 60 (shown in FIGS. 5 and 6, respectively) are shown positioned adjacent to the support table 200 in such a manner that the tapes are deposited on the upper forming surface of the tool 20.

FIG. 10 is an end view of the table 200 and the module 50. A drive assembly DA, seen to be supported below the table 200, includes a servo motor 203, a drive gear 204, a drive chain 205, idler rolls 206, a skate lock 207, and a skate drive pin 208. The drive assembly DA causes the skate 30 to be driven along the track 202.

Figure 11:
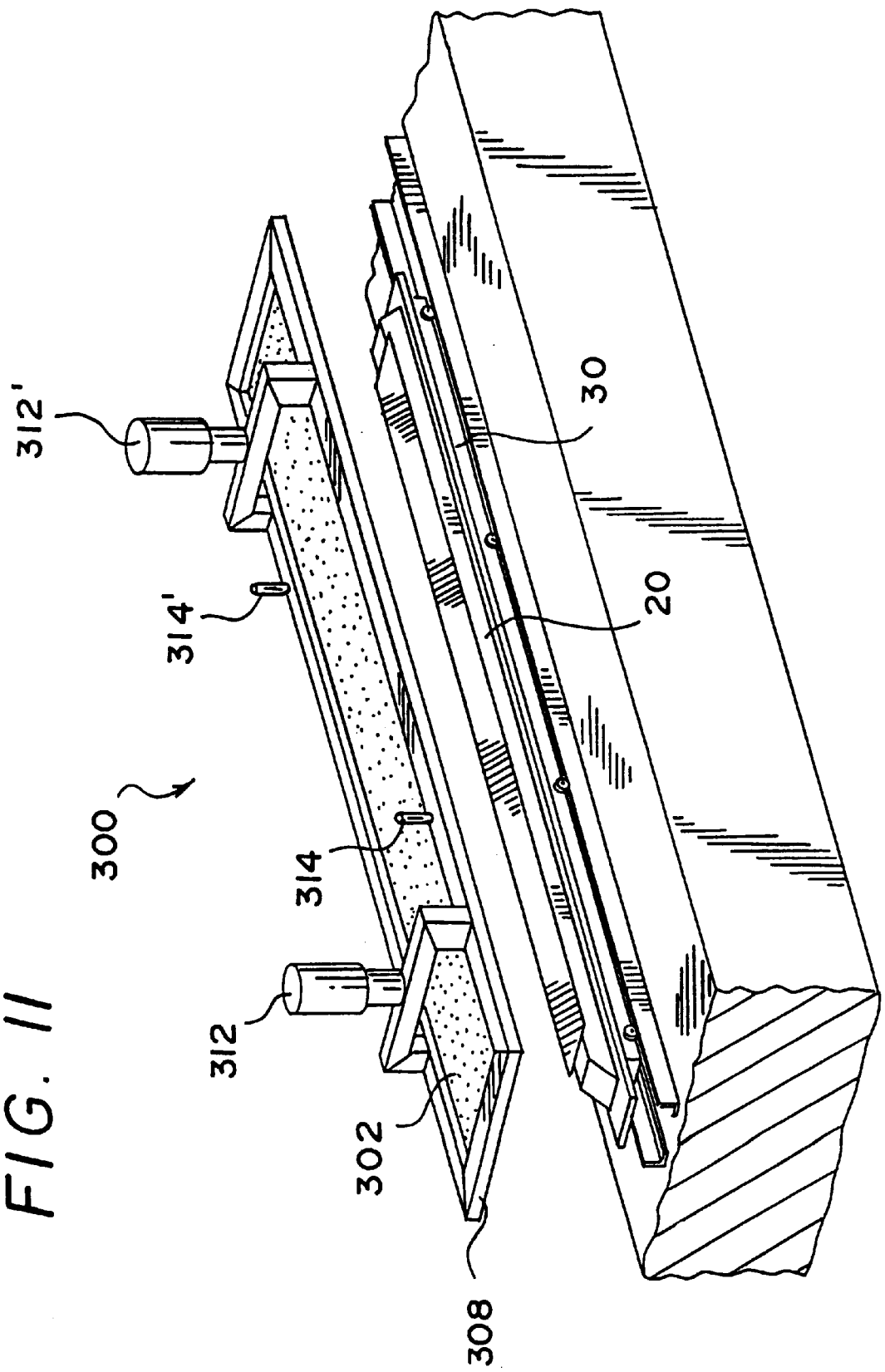
FIG. 11 is a perspective view of the debulking station used in the present invention.
Figure 13:
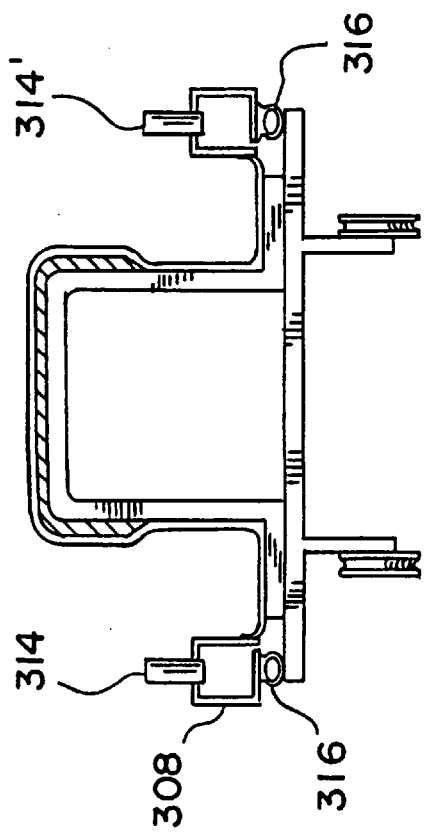
FIG. 13 is an end view of the debulking station shown in FIG. 11 with the membrane applied.
Figure 12:
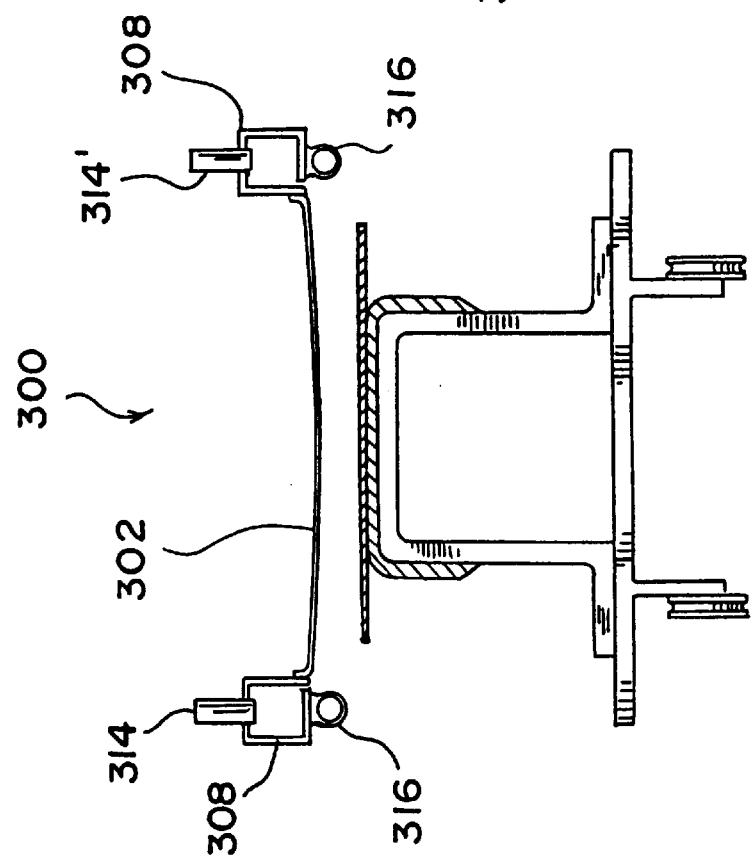
FIG. 12 is an end view of the debulking station shown in FIG. 11 with the membrane raised.

FIGS. 11–13 depict a debulking station 300 of the system where the skate is moved after desired layers of tape segments have been placed atop the tool forming surface. Debulking is a process known in industry where air between layers of the composite material that have been stacked on the tool can be squeezed out and discontinuities in the resulting, cured, structural member can be prevented.

In the apparatus shown in FIGS. 11–13, debulking is accomplished by engaging the attached layers of the web T with a rubber membrane that covers and presses against the entire length of the tool surface. The apparatus 300 enables drape forming the layered tape segments around the tool surface. The apparatus includes a rubber membrane 302 which is pressed against the tool 20 and the outer surface of the composite web material that has been disposed on the tool through the pulling effect of a vacuum system. The vacuum system includes pneumatic cylinders 312, 312' located near opposing ends of the membrane 302 and affixed to a frame member 308 which supports the membrane. Vacuum ports 314, 314' are included in the frame member for connection to conventional vacuum generating equipment.

After the composite material has been applied to appropriate tool forming surfaces, the tool 20 is moved by the automated tool transport system into a position at the debulking station 300 under the rubber membrane 302 (see FIG. 12). The frame member is lowered via the cylinders 312, 312' so that the membrane envelopes the tool and composite material on the tool. A seal 316 at the underside of the frame member abuts, and is driven into compressive engagement with, the skate to form an essentially hermetic chamber within which is located the tool and composite material (see FIG. 13). A vacuum is created inside the chamber (via the vacuum ports and the vacuum generating equipment), to pull the membrane down into tight engagement with the composite material on the tool. This squeezes all air from between adjacent layers in the composite material buildup.

After a predetermined period of time has elapsed, the vacuum under the membrane is relieved, and the membrane is separated and raised from the tool. The tool transport system then moves the tool out from the debulking station, and the tool is either moved back to the tape delivery station to receive another layer of tape or moved to a tool storage area for short or long term storage.

FIG. 13 shows a tool removal system used with the apparatus of the present invention. The tool removal system enables movement and storage of the lay-up tools 20 off and into storage racks adjacent to the system.

Preferably, heating apparatus (not shown) is positioned within each lay-up tool for heating the tool surfaces prior to their being routed to a desired web dispensing module. Heating of the tool enables better adherence of uncured composite web segments to the tool forming surface or to previously dispensed layers of tape. The heating apparatus includes sensors and tool temperature monitoring devices.

Referring now to FIG. 14, there is shown a lifting mechanism 132 (for example, a scissor lift device) supported on an overhead rail 134 for movement from one location adjacent to the track to a second location adjacent to a tool storage rack 142. The lifting mechanism has a pair of side-by-side lift forks 136 spaced apart a distance sufficient to support a tool 138 thereon. The lifting mechanism is able to move in a vertical manner so as to lift the tool 138 off the skate 32 and then, by virtue of its movement along the horizontal overhead rail, displace the tool from the skate to the storage rack. Of course, it is to be understood that the reverse movements can be accomplished by the lifting mechanism as well so as to move a tool 138' from the storage rack to a skate.

Figure 15:
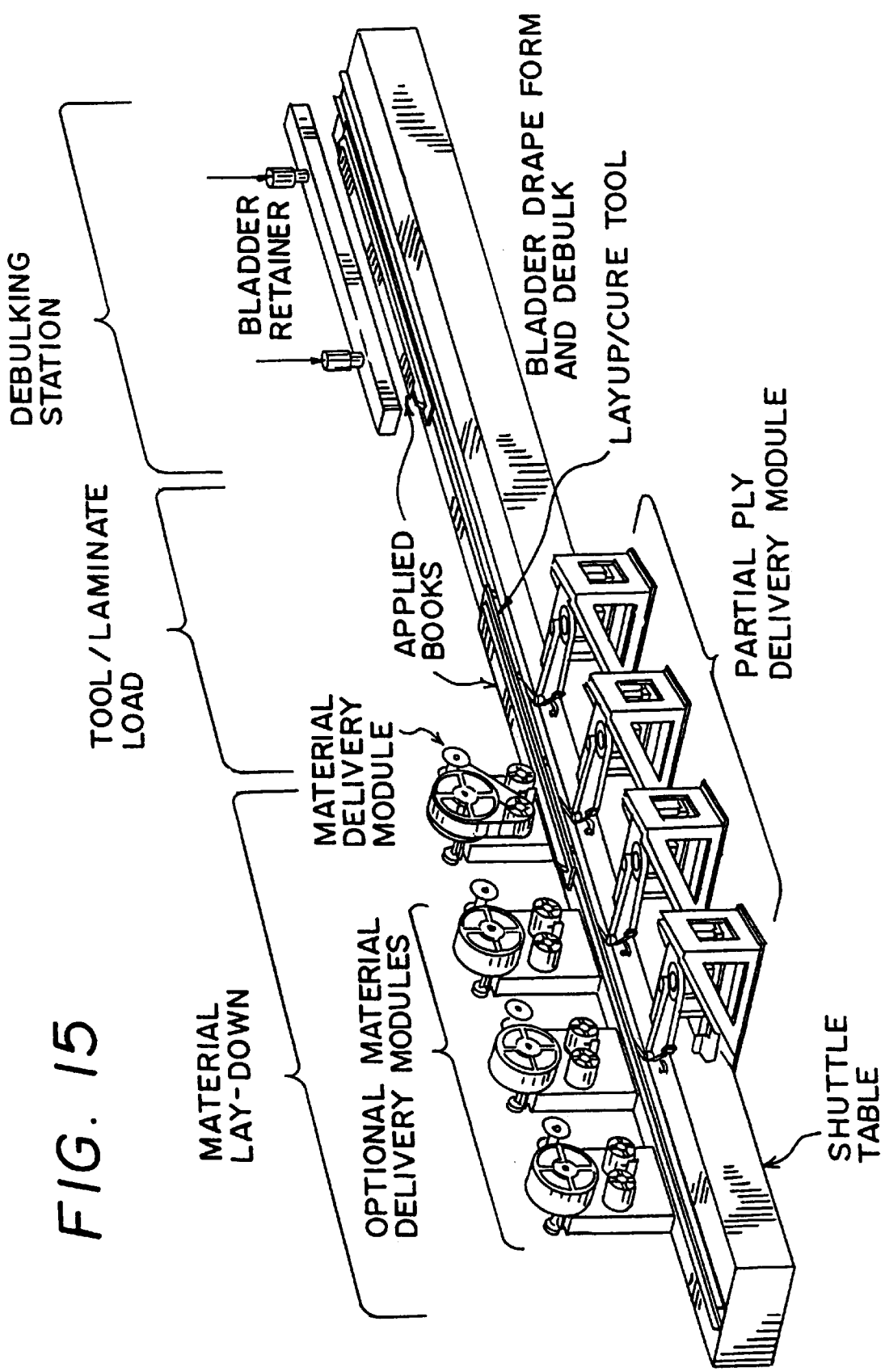
FIG. 15 is a perspective view of an exemplary layout of the system according to the present invention.

FIG. 15, which has previously been described, shows the various components of which the tape build-up system of the present invention is comprised. The Figure depicts one example of how the tape dispensing modules, the track system, and the debulking apparatus can be arranged; many other arrangements are possible.

While the present invention has been described in conjunction with specific embodiments thereof, it is evident that many alternatives, modification, and variations will be apparent to those skilled in the art in light of the foregoing description. Accordingly, the present invention is intended to embrace all alternatives, modifications, and variations which fall within the spirit and scope of the appended claims.

What I claim is:

1. Apparatus for forming structural members from uncured cross-ply composite tape material, comprising:

a forming tool having forming surface means, a first station, said first station comprising:

at least one cross-ply tape dispensing means, said dispensing means comprising a spool of uncured cross-ply composite tape material and adapted for applying one or more layers of said uncured cross-ply composite tape to a portion of said forming surface means, and at least one side tape dispensing means for applying unidirectional tape to side forming surfaces of said tool, said at least one side tape dispensing means including a first platform, a second platform movable relative to said first platform, and wherein said side tape dispensing means is carried by said second platform, a second station spaced from said first station and including means for pressing said cross-ply tape against said tool surface means to remove trapped gases, storage means for storing said tool, and means for moving said tool between said storage means, said first station and said second station.

2. The apparatus of claim 1, wherein said means for moving said tool comprises track means arranged between said storage means, said first station and said second station, and a skate movable on said track means for supporting said forming tool.

3. The apparatus of claim 2, and further including means for driving said skate on said track means.

4. The apparatus of claim 1, wherein said at least one cross-ply tape dispensing means includes means for removing backing paper from said cross-ply tape.

5. The apparatus of claim 1, wherein said at least one cross-ply tape dispensing means includes plate means having one end arranged for stripping backing paper from said cross-ply tape, said plate means further having a surface for guiding said stripped cross-ply tape from said one end to the forming surface of said tool.

6. The apparatus of claim 5, and further including means for inverting said stripped cross-ply tape before it is deposited on said tool forming surface.

7. The apparatus of claim 6, and further including means for selectively operating said inverting means.

8. The apparatus of claim 1, wherein said at least one cross-ply tape dispensing means includes means for applying cross-ply tape to less than the fill width of said tool forming surface.

9. The apparatus of claim 1, wherein said second platform is located within said first platform, and further including actuator means coupling said first and second platforms for moving said second platform relative to said first platform.

10. The apparatus of claim 9, wherein said actuator means includes means for imparting horizontal, vertical and rolling motions to said second platform.

11. The apparatus of claim 10, wherein said actuator means comprises a first means for imparting horizontal motion to said second platform, a second means for imparting vertical motion to said second platform, and a third means for imparting rolling motion to said second platform.

12. The apparatus of claim 10, further including a third platform supported by said second platform for depositing unidirectional tape on said side surfaces of said forming tool, said third platform bearing tape storage means, tape guide means, tape severing means, and tape pressing means for pressing said severed tape against one side surface of said forming tool.

* * * * *